O. G. WORSLEY.
RESILIENT VEHICLE WHEEL.
APPLICATION FILED MAR. 17, 1919

1,306,454.

Patented June 10, 1919.

Inventor:
Otto G. Worsley
By Walter M. Fuller
Atty.

UNITED STATES PATENT OFFICE.

OTTO G. WORSLEY, OF CHICAGO, ILLINOIS.

RESILIENT VEHICLE-WHEEL.

1,306,454.  Specification of Letters Patent.  Patented June 10, 1919.

Application filed March 17, 1919. Serial No. 283,129.

*To all whom it may concern:*

Be it known that I, OTTO G. WORSLEY, a citizen of the United States, residing at Chicago, in the county of Cook and State of Illinois, have invented certain new and useful Improvements in Resilient Vehicle-Wheels, of which the following is a specification.

My invention pertains to improvements and features of novelty and advantage in spring, cushion or resilient vehicle-wheels, and concerns particularly elements of construction in the felly on which the tire rim is mounted. The new style and type of felly is especially, but not exclusively, adapted for employment in spring wheels in which the felly is connected to the hub by bent leaf springs, the outer ends of which are accommodated in the hollow felly and fastened thereto. To permit such felly to shift in its plane toward and from the hub, the wheel is equipped with yokes, shoes, or guides overlapping the felly and mounted on suitable spokes connected to the hub.

In a co-pending patent application I have shown and described a felly structure for such a wheel comprising two circular channel members, the inner one with outstanding flanges and the outer one with inwardly projecting flanges in register with those of the companion inner member, suitable means being provided for maintaining such parts in alinement or register.

The present invention aims to provide a stiffer and stronger construction, one in which a broken spring may be removed or replaced with another from outside rather than hooked into place from the inside through an aperture in the inner felly member, a structure the parts of which may be more quickly and easily assembled, and one in which only one of the felly members is required to be welded. To the attainment of these and other desirable objects the felly is made of two channel members, the outer one of which is transversely split and does not require welding because it is held in place by the endless, circular rim mounted thereon, such outer felly element having its inwardly disposed flanges overlapping those of the companion inner element.

In order that those skilled in this art may have a full and complete understanding of this invention and its various advantages both from structural and functional standpoints I have illustrated in the accompanying drawing forming a part of this specification a preferred and desirable embodiment of the invention.

Figure 1:
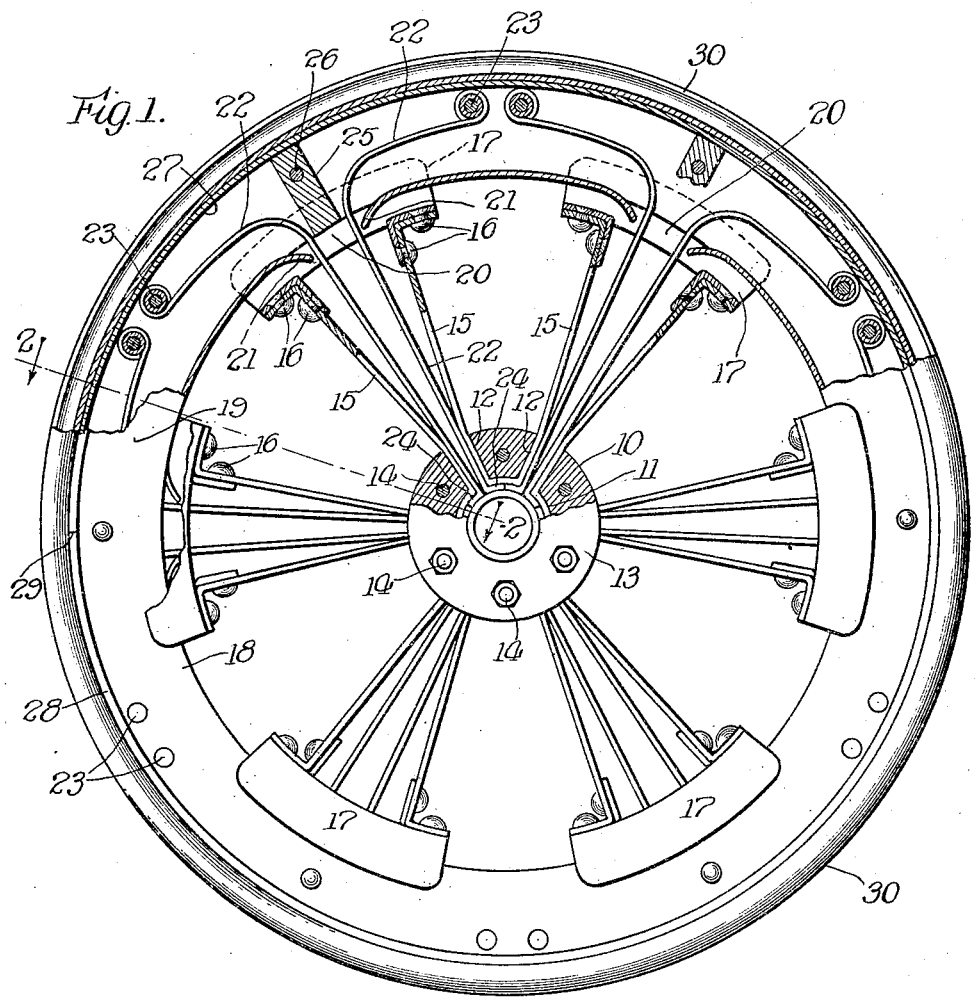
Figure 2:
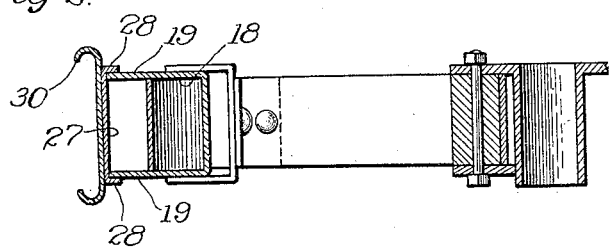

In this drawing:

Figure 1 is a partial vertical section and partial elevation of the improved wheel; and Fig. 2 is a horizontal section on line 2—2 of Fig. 1, the parts being viewed in the direction indicated by the arrows.

Referring to this drawing it will be observed that the wheel comprises a hub 10 having an inner circular groove 11 and spaced radial apertures 12, 12 communicating therewith, the side of the hub being equipped with a removable face plate or disk 13 held in position on the hub by a suitable number of bolts 14. These channels or passages accommodate a plurality of bent bars 15 of general converging or tapered U-shape constituting wheel spokes, the outer ends thereof being bent at right angles as shown in Fig. 1 and riveted at 16, 16 to parts of the yokes, shoes or guides 17 of general channel or U-shape in cross-section. In the present instance six of such yokes, or guide shoes, are employed, but the exact number is, of course, immaterial.

The hollow felly of the wheel, partly accommodated and shiftable in its own plane in such yokes or shoes, is composed of an inner circular channel member 18, which may be of one continuous integral piece, or may be built up of separate arcuate sections, with its parallel flanges 19, 19 disposed outwardly as shown. At intervals the web of such felly element is apertured at 20, 20 between the companion spoke elements and the metal at the margins or borders of such holes are curved inwardly at 21, 21.

The bent leaf springs 22, 22 which connect the hub and felly project through such apertures into the hollow interior of the felly, whereby their outer ends are secured to the flanges 19, 19 by transverse rivets 23 around which their ends are coiled or formed with a loop or eye. These springs are of general right-angle formation, two of such oppositely-arranged being located between each pair of spoke elements 15, 15. The inner end 24 of each spring is bent to one side and is seated in the hub groove 11 beneath the corresponding spoke bar.

To prevent the entrance of mud, dirt, snow, water, etc., to the interior of the felly, the latter opposite each pair of spoke elements is fitted internally with a suitable filler-block 25 positioned between the adjacent springs, such blocks being held in place by cross rivets 26 as shown.

The outer element 27 of the felly is of shallow channel formation in cross-section, having relatively-narrow flanges 28, 28 which overlap the outer portions of flanges 19, 19, these interfitting or interlocking channels thus forming unitedly a circular hollow felly of adequate strength, stiffness, and strain resisting capacity. To this end also the inner face of the web of the outer channel member bears against edges of flanges 19 of the other channel. This external felly member need not have its ends welded together and hence it is left with a transverse split or division at the point 29.

The usual endless circular tire rim 30 is forced over the felly sidewise with a tight fit and hence securely holds or locks element 27 from expanding or becoming detached from its coöperating felly element 18.

To those skilled in this art it will be appreciated that because the comparatively wide flanges 19, 19 form constituent parts of the inner channel member they give it maximum strength, stiffness, and rigidity. Also by reason of the overlapping of the two sets of the channel flanges the felly elements are securely locked together against transverse displacement or malalinement. Furthermore, because the rim 30 fits over the divided or split member 27 and hence eliminates any possibility of its expanding, the ends of such felly member need not be welded together, thus enabling it to be readily taken off as explained below as occasion requires. Due to the comparatively few parts entering into the construction they may be easily assembled in proper relation with facility and despatch.

In case a spring breaks or requires removal for the introduction of a new one, this substitution is relatively easily accomplished by pressing off the tire rim 30, removing the split and hence somewhat expansible felly element 27, driving out the proper rivet 23, and pulling out the spring from the outside, its inner end, of course, having been first freed from the hub. The new spring can now be readily inserted from the outside, its inner end secured to the hub, its rivet put in place, the split felly ring 27 sprung over the flanges 19, and the rim 30 pressed or forced into position, thus securely and firmly interlocking all the parts, in such manner, however, that any spring can be taken out with comparative ease.

By those skilled in this art it will be understood and appreciated that the invention is not limited and restricted to the precise and exact features of construction presented because these may be modified within comparatively wide limits without departure from the heart and essence of the invention and without the sacrifice of any of its substantial benefits and advantages. In other words, the invention is susceptible of a variety of embodiments and the one set forth in this application is presented merely by way of example.

I claim:

1. In a cushioned wheel structure of the character described, the combination of a hub, radiating spokes secured thereto, guide-shoes mounted on said spokes, a hollow felly coöperating with and guided in its movements by said shoes, said felly comprising an inner circular member channel-shape in cross-section with its flanges extended outwardly and an outer circular transversely-split element channel-shape in cross-section with its flanges extended inwardly and overlapping the companion flanges of said inner member, springs projecting into said felly through apertures in the web of said inner felly member and fastened to the felly and to the hub, and a rim removably fitted over said outer felly element preventing its expansion, substantially as described.

2. In a cushioned wheel of the character described, the combination of a hub, a hollow felly comprising inner and outer oppositely-disposed circular members channel-shape in cross-section with their flanges in overlapped relation, said outer member being transversely split, a rim over and normally preventing expansion of said outer member, and bent springs attached to said hub and projecting into said felly through apertures in the web of said inner channel-member and means fastening said ends in the felly to said inner channel-member, substantially as described.

3. In a cushioned wheel of the character described, the combination of a resiliently-mounted hollow felly comprising an inner circular member channel-shape in cross-section with its flanges disposed outwardly and an outer transversely-split channel-shape element with its flanges extended inwardly and overlapping the flanges of said inner member, the edges of the latter flanges bearing against the inner face of the web of said outer element, and a rim removably fitted on said felly and normally preventing expansion of said outer felly element, substantially as described.

OTTO G. WORSLEY.

Copies of this patent may be obtained for five cents each, by addressing the "Commissioner of Patents, Washington, D. C."